(12) United States Patent
Chuang et al.

(10) Patent No.: US 7,120,764 B2
(45) Date of Patent: Oct. 10, 2006

(54) METHOD AND RELATED APPARATUS FOR CONTROLLING DATA TRANSMISSION IN A MEMORY

(75) Inventors: Eric Chuang, Taipei Hsien (TW); Macalas Yen, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 313 days.

(21) Appl. No.: 10/709,368

(22) Filed: Apr. 29, 2004

(65) Prior Publication Data

US 2005/0055488 A1    Mar. 10, 2005

(30) Foreign Application Priority Data

Sep. 10, 2003   (TW) ............................... 92125063 A

(51) Int. Cl.
*G06F 12/00*       (2006.01)
(52) U.S. Cl. .............................. 711/154; 710/22; 711/1
(58) Field of Classification Search .................... None
See application file for complete search history.

(56) References Cited

U.S. PATENT DOCUMENTS

| | | | | |
|---|---|---|---|---|
| 6,499,076 | B1 * | 12/2002 | Date et al. | 710/113 |
| 2003/0046489 | A1 * | 3/2003 | Yagi et al. | 711/113 |
| 2003/0088742 | A1 * | 5/2003 | Lee et al. | 711/147 |
| 2003/0206480 | A1 * | 11/2003 | Takahashi | 365/233 |
| 2004/0088467 | A1 * | 5/2004 | Burton | 710/309 |

* cited by examiner

*Primary Examiner*—Reginald Bragdon
*Assistant Examiner*—Thanh D. Vo
(74) *Attorney, Agent, or Firm*—Winston Hsu

(57) ABSTRACT

A computer system has a processor, a memory for storing data, and a memory controller electrically connected to the processor and the memory for controlling data transmission with the memory. The method includes driving the memory controller to retrieve a data bit located in a first memory address, and driving the memory controller to store the data bit in the a second memory address without delivering the data bit to the processor.

18 Claims, 4 Drawing Sheets

METHOD AND RELATED APPARATUS FOR CONTROLLING DATA TRANSMISSION IN A MEMORY

BACKGROUND OF INVENTION

1. Field of the Invention

The present invention relates to a method and related apparatus for controlling data transmission in a memory, and more particularly, to a method and related apparatus for controlling data transmission in a memory without the involvement of a CPU.

2. Description of the Prior Art

Please refer to FIG. 1. FIG. 1 is a schematic diagram of a computer system 10. As shown in FIG. 1, the computer system 10 includes a CPU 12, a north bridge circuit 14, a south bridge circuit 16, a display controller 18, a display 19, a memory 20, a hard disc 22, and an input device 24. The memory 20 includes a plurality of memory units 26 arranged in arrays, i.e. each memory unit 26 corresponds to a column address and a row address. When the computer system 10 operates, the CPU 12 loads data stored in the memory 20 to a register 28 therein. The data held in the register 28 is then processed, and sent back to the memory 20. The accessing operation of the data stored in the memory 20 is processed via a memory controller 30 of the north bridge circuit 14. The memory controller 30 includes an address register 32 and a data register 34, where the address register 32 is for storing memory addresses and the data register 34 is for storing data to be written in the memory 20 and data retrieved from the memory 20. For example, when the CPU 12 executes an instruction and therefore has to move a data bit D stored in a memory unit 26a to a memory unit 26b, the CPU 12 sends an address data ADDRESSa (a physical memory address) corresponding to the memory unit 26a to the address register 32. The memory controller 30 can therefore retrieve the data bit D stored in the memory unit 26a in accordance with the address data ADDRESSa, and store the data bit D in the data register 34. The memory controller 30 then delivers the data bit D to the register 28. Since the purpose of this instruction is to move the data bit D, no logic operations toward the data bit D are necessary. The CPU 12 only outputs an address data ADDRESSb to the address register 32 and delivers the data bit D held in the register 28 to the data register 34 so that the memory controller 30 writes the data bit D in the memory unit 26b in accordance with the address data ADDRESSb.

In the process of moving the data bit D stored in the memory unit 26a to the memory unit 26b, the CPU 12 does not need to execute any operations with respect to the data bit D. However, it takes a plurality of clock cycles for the CPU 12 to move the data bit D held in the data register 34 to the register 28 and to deliver the data bit D held in the register 28 to the data register 34. As a result, the load on the CPU 12 is increased. In addition, the transmission of the data bit D consumes the bandwidth of the front-side bus (FSB) between the CPU 12 and the north bridge circuit 14.

SUMMARY OF INVENTION

It is therefore a primary objective of the present invention to provide a method and related apparatus for controlling data transmission within a memory to solve the above problems.

According to the claimed invention, a method for controlling data transmission within a memory of a computer system is disclosed. The computer system comprises a processor, and a memory controller connected to the processor and the memory. The method comprises delivering a plurality of data located in a plurality of first memory addresses of the memory to the memory controller, and the memory controller directly storing the data in a plurality of second memory addresses of the memory instead of transmitting the plurality of data to the processor.

The present invention further provides a computer system comprising a processor for controlling operations of the computer system, a memory including a plurality of first memory addresses and second memory addresses, and a memory controller electrically connected to the processor and the memory. The memory controller has an internal data transmission controller for retrieving a plurality of data according to the first memory addresses, and directly storing the plurality of data in the second memory addresses instead of transmitting the plurality of data to the processor.

The internal data transmission controller of the computer system is engaged in processing the transmission of a data bit stored in the memory from one memory address to another. Consequently, the transmission is processed without the involvement of the CPU of the computer system.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
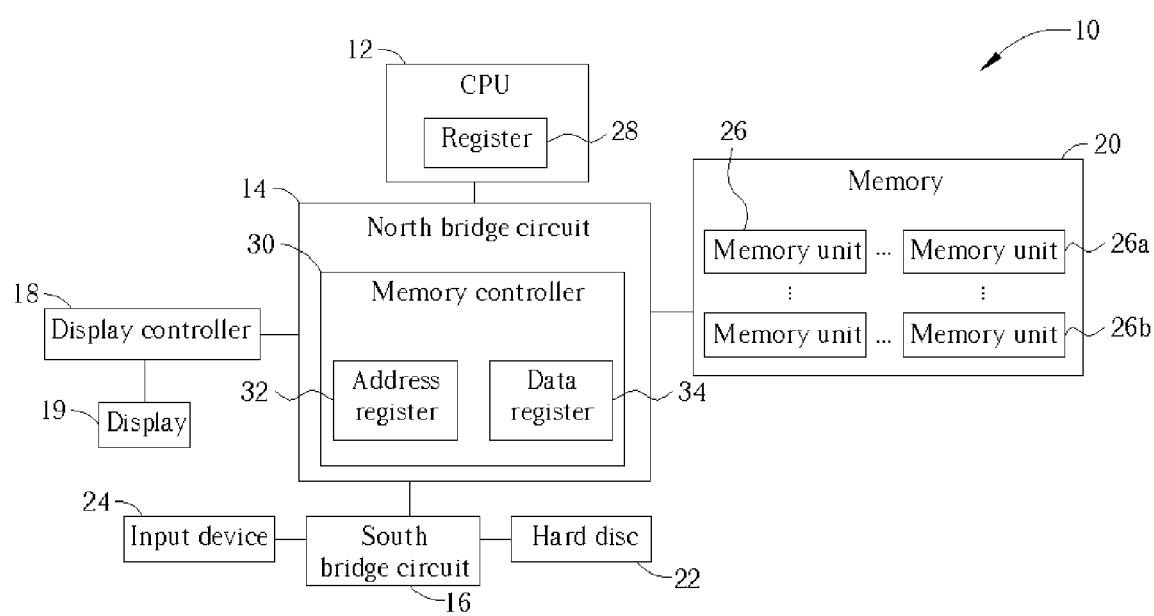
FIG. 1 is a schematic diagram of a computer system.
Figure 2:
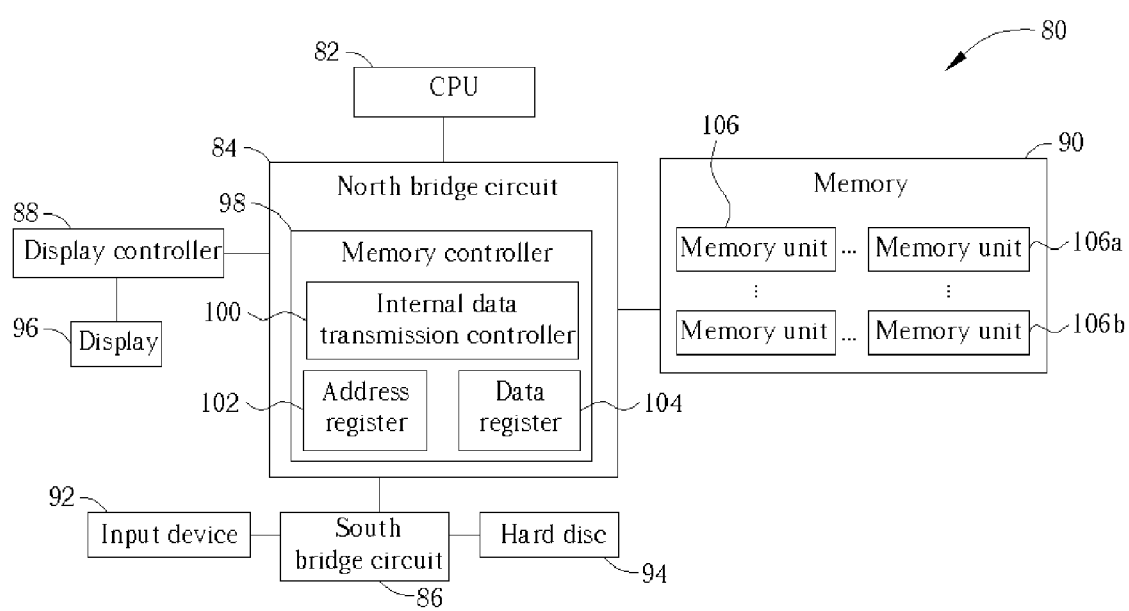
FIG. 2 is a schematic diagram of a computer system in a first embodiment of the present invention.

Please refer to FIG. 2. FIG. 2 is a schematic diagram of a computer system 80 in a first embodiment of the present invention. As shown in FIG. 2, the computer system 80 includes a CPU 82, a north bridge circuit 84, a south bridge circuit 86, a display controller 88, a memory 90, an input device 92, a hard disc 94, and a display 96. The north bridge circuit 84 has a memory controller 98, which includes not only an address register 102 and a data register 104 as the conventional memory controller, but also an internal data transmission controller 100 engaged in processing the transmission of data within the memory 90. With the internal data transmission controller 100, data of the memory 90 can be moved from a memory unit 106a to a memory unit 106b inside the north bridge circuit 84. The accessing operations of the CPU 82 are no longer required.

The internal data transmission controller 100 is engaged in processing the transmission of a data bit D from the memory unit 106a to the memory unit 106b. In the beginning of the transmission, a memory address ADDRESSa corresponding to the memory unit 106a is held in the address register 102. Then the internal data transmission controller 100 reads the memory unit 106a according to the memory address ADDRESSa, and stores the data bit D in the data register 104. Following that, a memory address ADDRESSb corresponding to the memory unit 106b is delivered to the address register 102, and the internal data transmission controller 100 writes the data bit D held in the data register 104 to the memory unit 106b according to the memory address ADDRESSb. It is worth noting that the data bit D is not delivered to the CPU 82 in the course of the transmission. As a result, the loading of CPU 82 is reduced, and the bandwidth of the FSB between the CPU 82 and the north bridge circuit 84 is not consumed.

Figure 3:
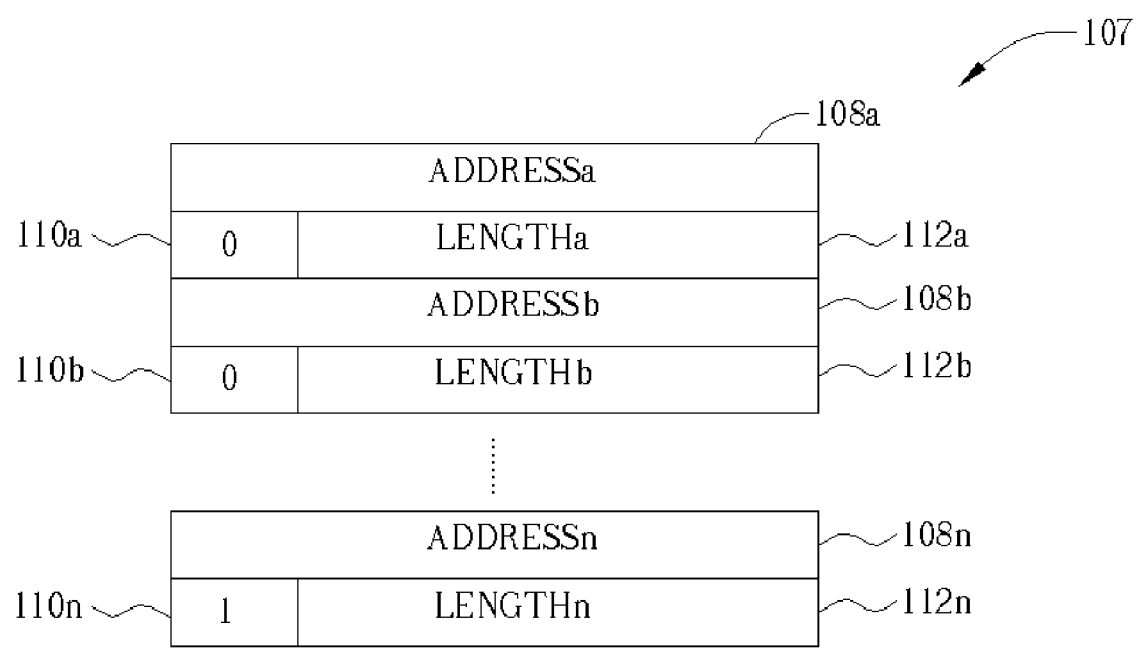
FIG. 3 is a schematic diagram of a memory address table of a memory.

In addition, if the data of the memory 90 to be transmitted includes a plurality of data bits, the memory controller 98 uses physical memory addresses (e.g. a memory address table) to access the memory units 106 of the memory 90. Please refer to FIG. 3. FIG. 3 is a schematic diagram of a memory address table 107 of the memory 90. As shown in FIG. 3, the memory address table 107 includes three kinds of fields where fields 108a, 108b, and 108n record the physical memory addresses, fields 110a, 110b, and 110n record flags which represent whether the data is an end portion (end of file, EOF), and fields 112a, 112b, 112n designate a bit length of each physical memory address recorded in fields 108.

When a program needs to process a data transmission in the memory 90, the program requests the operating system of the computer system 80 to obtain the physical memory addresses corresponding to the data stored in the memory 90, and generates the memory address table 107 stored in a predetermined block of the memory 90. Then the program outputs an instruction to command the internal data transmission controller 110 to retrieve data correctly according to the memory address table 107. Accordingly, the internal data transmission controller 100 reads the memory address ADDRESSa recorded in field 108a, retrieves a plurality of data bits from the memory address ADDRESSa in accordance with a bit length LENGTHa recorded in field 112a, and consecutively writes the data bits to the address register 102. Since the flag recorded in field 110a is "0", i.e. the data is not an end portion, the internal data transmission controller 100 then reads the memory address ADDRESSb recorded in field 108b, and retrieves a plurality of data bits from the memory address ADDRESSb in accordance with a bit length LENGTHb recorded in field 112b. Similarly, since the flag recorded in field 110b is "0", the internal data transmission controller 100 keeps on repeating the same action. The internal data transmission controller 100 will read the memory address ADDRESSn, retrieve a plurality of data bits according to a bit length LENGTHn recorded in field 112n, and stop since the flag recorded in field 110n is "1", i.e. end of file (EOF). In a similar manner, if the memory controller 98 needs to write data to the memory 90, the operating system will generate a memory address table 107 as shown in FIG. 3 for recording the physical memory addresses. Accordingly, the internal data transmission controller 100 can write data held in the data register 104 to the memory units 106 of the memory 90 according to the memory address table 107.

It is noted that if the data stored in the memory 90 correspond to a plurality of physical memory addresses 106a which are discontinuous, the memory address table 107 is required to read the data. Similarly, when the physical memory addresses 106b to where the data will be moved are discontinuous, the memory address table 107 is also required. However, if the data stored in the memory 90 correspond to a plurality of physical memory addresses that are continuous, the operating system only has to provide a source memory address, a bit length, and a target memory addresses so that the internal data transmission controller 100 can consecutively read the data bits from the source memory address according to the bit length, and write the data bits to the target memory address. Certainly, there may be more than one target address, and in such case the memory address table 107 is also required to write the data bits to different target memory addresses.

Figure 4:
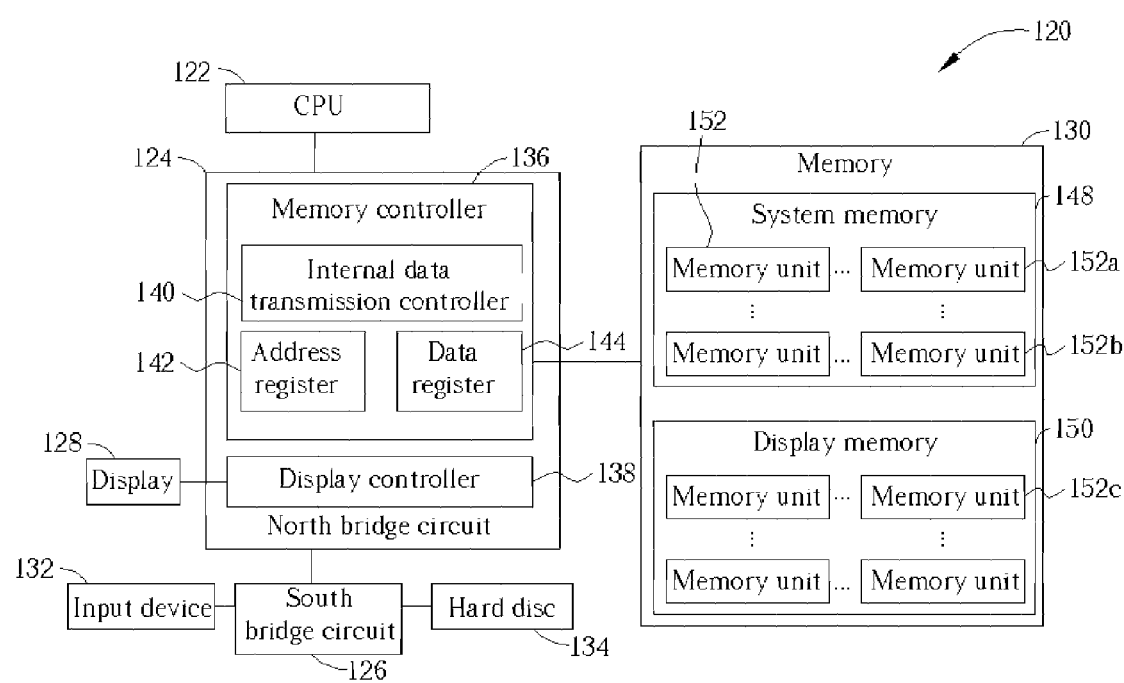
FIG. 4 is a schematic diagram of a computer system in a second embodiment of the present invention.

Please refer to FIG. 4. FIG. 4 is a schematic diagram of a computer system 120 in a second embodiment of the present invention. As shown in FIG. 4, the computer system 120 includes a CPU 122, a north bridge circuit 124, a south bridge circuit 126, a display 128, a memory 130, an input device 132, and a hard disc 134. The north bridge circuit 124 includes a memory controller 136, and a display controller 138. The memory controller 136 further includes an internal data transmission controller 140, an address register 142, and a data register 144. The memory 130 is divided into a system memory 148 and a display memory 150 both comprising a plurality of memory units 152 arranged in arrays. The computer system 120 adopts a unified memory architecture (UMA), and thus the CPU 122 and the display controller 138 share the memory 130 for accessing data. In other words, the CPU 122 uses the system memory 148 while the display controller 138 uses the display memory 150. Note that the components having the same terminology in FIG. 4 and FIG. 2 have the same function, and thus redundant descriptions are not given herein. In this embodiment, the memory controller 140 transmits a data bit D from a memory unit 152a to a memory unit 152c of the display memory 150, or transmits a data bit D from a memory unit 152c of the display memory 150 to a memory unit 152a. The transmission is carried out by the internal data transmission controller 140, instead of by the CPU 122. Consequently, the load on the CPU 122 is reduced, and the bandwidth of the FSB between the CPU 122 and the north bridge circuit 124 is not consumed.

Similar to the first embodiment of the present invention, the internal data transmission controller 140 can transmit data whether the physical memory addresses are continuous or not. If the physical memory addresses are discontinuous, the internal data transmission controller 140 transmits data in accordance with the memory address table 107 (shown in FIG. 3). If the physical memory addresses are continuous, the internal data transmission controller 140 only needs a source memory address for designating the start address, a bit length, and a target memory address for designating where in the memory 130 the data is to be moved to execute the transmission.

The memory controller of the computer system includes an internal data transmission controller engaged in transmitting data within the memory. When data bits stored in a memory address need to be transmitted to another memory address in the memory, the internal data transmission controller reads the data bits, stores the data bits in the data register, and stores the data bits in another memory address of the memory. It is clear that the transmission of the data bits is completely executed by the internal data transmission controller, without the involvement of the CPU. As a result, the loading of the CPU is reduced. In addition, the computer system of the present invention is more efficient since the bandwidth of the FSB between the CPU and the north bridge circuit is not consumed in the course of the transmission.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A method of controlling data transmission within a memory of a computer system, the computer system comprising a processor, and a memory controller connected to the processor and the memory, the method comprising the following steps:
  delivering a plurality of data located in a plurality of first memory addresses of the memory to the memory controller;
  the memory controller directly storing the plurality of data in a plurality of second memory addresses of the memory instead of transmitting the plurality of data to the processor: and
  if the first memory addresses are continuous, delivering a source memory address and a bit length of the plurality of data to the memory controller.

2. The method of claim 1 wherein the memory further provides a target memory address so that the memory controller directly stores the plurality of data in the second memory addresses which are continuous.

3. The method of claim 1 wherein the memory further provides a plurality of target memory addresses so that the memory controller directly stores the plurality of data in the second memory addresses which are discontinuous.

4. The method of claim 1 wherein if the first memory addresses are discontinuous, a first memory address table is provided to the memory controller for receiving the plurality of data.

5. The method of claim 4 wherein the first memory address table comprises a plurality of fields, each field comprising a physical memory address, a bit length, and a flag for respectively recording a start address, a bit length, and whether the plurality of data is an end portion with respect to the first memory addresses.

6. The method of claim 4 wherein if the second memory addresses are discontinuous, a second memory address table is provided so that the memory controller directly stores the plurality of data in the second memory addresses.

7. The method of claim 6 wherein the second memory address table comprises a plurality of fields, each field comprising a physical memory address, a bit length, and a flag for respectively recording a start addresses, a bit length, and whether the plurality of data is an end portion with respect to the first memory addresses.

8. The method of claim 4 wherein if the second memory addresses are continuous, the memory provides a target memory address so that the memory controller directly stores the plurality of data in the second memory addresses.

9. A computer system comprising:
  a processor for controlling operations of the computer system;
  a memory comprising a plurality of first memory addresses and a plurality of second memory addresses; and
  a memory controller electrically connected to the processor and the memory, the memory controller having an internal data transmission controller for retrieving a plurality of data according to the first memory addresses, and directly storing the plurality of data in the second memory addresses instead of transmitting the plurality data to the processor;
  wherein if the first memory addresses are continuous, a source memory address and a bit length of the plurality of data are delivered to the memory controller and at least a target memory address is provided so that the memory controller directly stores the plurality of data in the second memory addresses.

10. The computer system of claim 9 wherein the memory controller further comprises: an address register for receiving the first memory addresses and the second memory addresses; and a data register for storing the plurality of data.

11. The computer system of claim 9 wherein the memory controller is installed in a north bridge circuit.

12. The computer system of claim 9 wherein the memory comprises a display memory and a system memory.

13. The computer system of claim 12 wherein the first memory addresses are in the display memory and the second memory addresses are in the system memory.

14. The computer system of claim 12 wherein the first memory addresses are in the system memory and the second memory addresses are in the display memory.

15. The computer system of claim 9 wherein if the first memory addresses are discontinuous, a first memory address table is provided to the memory controller for receiving the plurality of data.

16. The computer system of claim 15 wherein the first memory address table is generated by an operating system of the computer system.

17. The computer system of claim 15 wherein if the second memory addresses are discontinuous, a second memory address table is provided so that the memory controller directly stores the plurality of data in the second memory addresses.

18. The computer system of claim 17 wherein the second memory address table is generated by an operating system of the computer system.

* * * * *